United States Patent [19]

Williams et al.

[11] Patent Number: 4,582,392

[45] Date of Patent: Apr. 15, 1986

[54] FIBER OPTIC CONNECTOR HAVING OPERATABLE FIBER RETENTION MEANS

[75] Inventors: Russell H. Williams; Peter Garner, both of Flemington; K. Scott Gordon, Sergeantsville, all of N.J.

[73] Assignee: Thomas & Betts Corporation, Raritan, N.J.

[21] Appl. No.: 665,227

[22] Filed: Oct. 26, 1984

Related U.S. Application Data

[63] Continuation of Ser. No. 369,114, Apr. 16, 1982, abandoned.

[51] Int. Cl.⁴ ............................................. G02B 7/26
[52] U.S. Cl. .................................... 350/96.20; 83/167
[58] Field of Search ........................... 350/96.20, 96.23; 83/167

[56] References Cited

U.S. PATENT DOCUMENTS

| | | | |
|---|---|---|---|
| 3,469,750 | 9/1969 | Vanderbeck | 225/94 |
| 3,981,422 | 9/1976 | Moore | 225/2 |
| 4,158,476 | 6/1979 | McCartney | 350/96.21 |
| 4,181,402 | 1/1980 | Borsuk et al. | 350/96.21 |
| 4,245,537 | 1/1981 | Curtis | 83/879 |
| 4,249,305 | 2/1981 | Basile | 30/164.9 |
| 4,326,767 | 4/1982 | Silbernagel et al. | 339/98 |
| 4,333,705 | 6/1982 | Mead | 350/96.20 |
| 4,444,448 | 4/1984 | Silbernagel et al. | 339/98 |

FOREIGN PATENT DOCUMENTS 1425264  2/1976  United Kingdom ............... 350/96.2

Primary Examiner—John Lee
Assistant Examiner—Lester Rushin, III
Attorney, Agent, or Firm—Robert M. Rodrick; Salvatore J. Abbruzzese

[57] ABSTRACT

A composite fiber cutting and terminating apparatus includes parent and insert housings supported for relative movement, the parent housing supporting therein both a terminating device, such as a photodiode, and a cutting device. The insert housing has a fiber receiving channel. Upon movement of the insert housing into the parent housing, the fiber is retentively engaged by the insert housing and is cut to define a termination end face and the termination end face is disposed in registration with the termination device.

18 Claims, 7 Drawing Figures

FIBER OPTIC CONNECTOR HAVING OPERATABLE FIBER RETENTION MEANS

This is a continuation of application Ser. No. 06/369,114, filed Apr. 16, 1982 now abandoned.

FIELD OF THE INVENTION

This invention relates generally to fiber optic cutting and terminating apparatus and pertains more particularly to fiber optic devices wherein a bridging of fiber cutting and termination phases is provided.

BACKGROUND OF THE INVENTION

In fiber optic connection schemes known prior to the invention set forth in copending, commonly assigned U.S. Pat. No. 4,422,715, issued on Dec. 27, 1983, entitled "Fiber Optic Connector Having Fiber Cutting Means", field termination of optical fibers was attended by labor-intensive, separate attention to the phases of fiber preparation for termination, on the one hand, and fiber termination, on the other hand. In the former phase, such steps as fiber jacket stripping, end face cutting and polishing were customary steps. In the latter phase, the prepared fiber was typically placed in a housing and secured therein and that housing was manipulated relative to another housing having a termination device to be so placed therein that the fiber end face and termination device were accurately in registry.

In the referenced, commonly-assigned patent, there is disclosed a fiber optic connector or component in which a cutting device and a termination device are supported in fixed mutual relation, e.g., in a common housing. A companion housing provides for retentive engagement of the fiber. The housings are joinable in a first pre-cutting relation wherein the fiber spans the housings, are mutually movable into a second relation effecting fiber cutting and are further mutually movable into a third relation providing registry of the termination device and the termination end face resulting from the cutting. The apparatus comprised of the common and companion housings remains in place, constituting a connector. In its provision of a bridging method as between fiber preparation for termination and termination itself and apparatus for both cutting and terminating a fiber, the invention of U.S. Pat. No. 4,422,715 provides an evident lessening of labor intensity in fiber optic field termination.

SUMMARY OF THE INVENTION

The present invention has as its object the provision of further fiber optic cutting/terminating method and apparatus of type having the bridging character of the referenced application.

A further object of the invention is to provide improved component parts of fiber optic connectors.

In attaining the foregoing and other objects, the invention provides apparatus generally of type encompassed by the referenced copending application and embodying translational movement of housings for effecting cutting and termination, but wherein retentive securement of a fiber is realized in the course of mutual displacement of the housings.

In its particularly preferred embodiment, the invention uses one housing as a parent housing and arranges the companion housing as an insert housing, i.e., the parent housing has an insertion channel for receiving the insert housing. The parent housing has a cutting blade disposed adjacent its insertion channel. The insert housing has a fiber receiving channel and includes deflectable means engageable with a surface of the insertion channel in the course of insertion to secure the fiber as it is cut by the cutting blade and as the fiber termination end face is thereafter moved into registry with a terminating device or termination registry surface in the parent housing.

In other aspects, the invention provides for a pre-latched relationship as between its parent and insert housings for ready non-retentive disposition of a fiber therein preparatory to cutting and termination and for a fully latched relationship between the housings following fiber securement, cutting and termination.

The foregoing and other features and aspects of the invention will be further evident from the following detailed description of preferred embodiments thereof and from the drawings wherein like reference numerals are used to identify like parts throughout.

DESCRIPTION OF PREFERRED EMBODIMENTS

Figure 1:
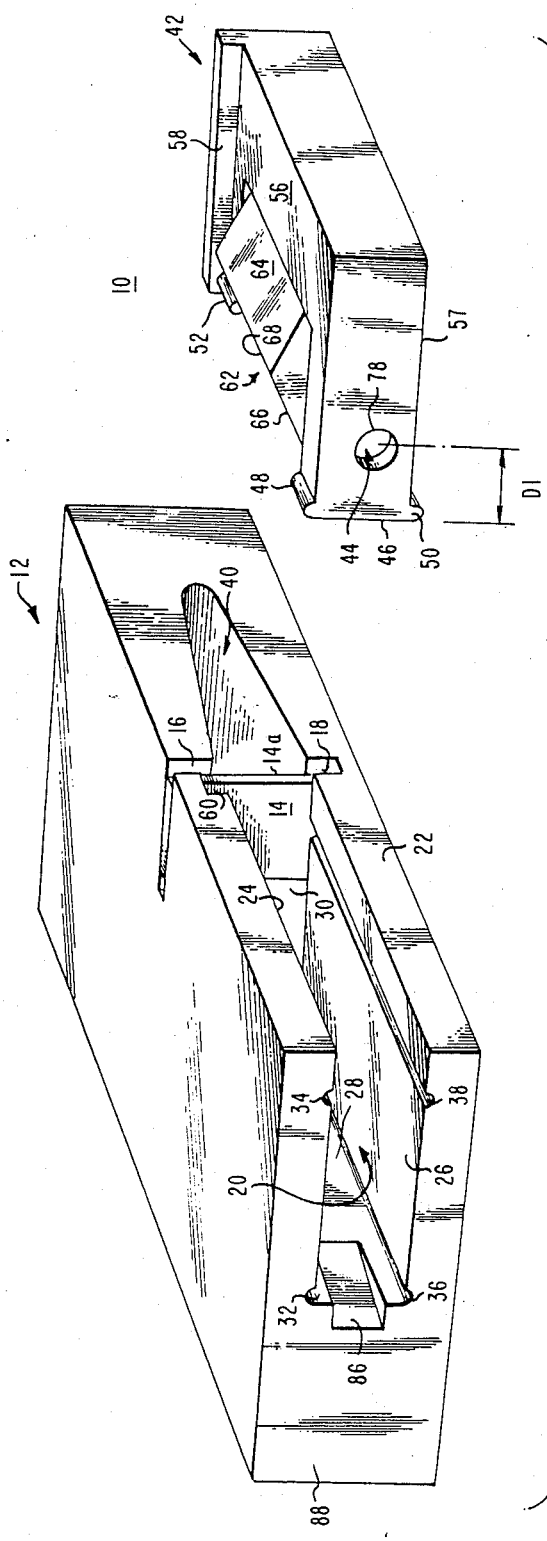
FIG. 1 is a perspective view of apparatus in accordance with the invention with its parent and insert housings in unassembled condition.

Referring to FIG. 1, fiber optic apparatus 10 has parent housing 12, which supports blade 14 having cutting edge 14a, blade 14 being insertable into housing 12 through slots 16 and 18 and then suitably staked or otherwise secured therein. Forwardly of blade 14, housing 12 defines insertion channel 20, which opens into sidewall 22 of housing 12 and is bounded by ceiling 24, floor 26, interior wall 28 and rear wall 30. Ceiling 24 provides arcuately sectioned detent tracks 32 and 34 and floor 26 provides corresponding detent tracks 36 and 38. Rearwardly of blade 14 and aligned rear wall 30, housing 12 provides fiber remnant exit chute 40 which opens exteriorly of housing 12.

Figure 5:
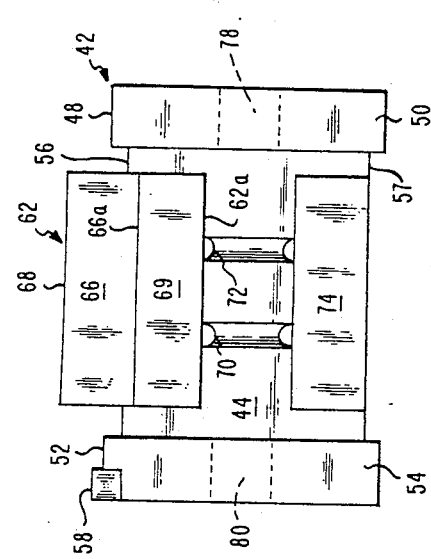
FIG. 5 is a left side elevation of the insert housing of FIG. 1.

Insert housing 42 has channel 44 extending therethrough for receiving an optical fiber. At its leftward sidewall 46, insert housing 42 has ribs 48, 50, 52 and 54 (FIG. 5), extending outwardly of housing surfaces 56 and 57 and being of the same arcuate section as detent tracks 32–38 to interfit therewith, as discussed below. At its rightward end, housing 42 has flange 58 extending upwardly of housing top surface 56 and configured to be insertable in guide 60 of parent housing 12. Fiber gripper 62 is cantilever supported in insert housing 42, and includes mutually angled sections 64 and 66, the apex 68 therebetween being disposed upwardly of surface 56. Considering FIG. 5, gripper section 66 terminates linewise at surface 66a, which is disposed downwardly of insert housing surface 56, and has gripper end section 69 depending therefrom. Undersurface 62a of gripper 62 has ribs 70 and 72 of insert housing 42 extending therefrom to base 74 in facing relation to fiber channel 44.

Parent housing 12 desirably provides an EMI (electromagnetic interference) shielded environment for any optoelectronic transducers or semiconductors necessary to complete a communication channel and hence may be constituted of aluminum, carbonized plastic, or a plastic that is coated, e.g., with chrome on a nickel-copper underplate. The plastic composition need provide rigidity and may be a polycarbonate. Insert housing 42 may be a resilient member molded from a high coefficient of friction thermoplastic, e.g., a duPont elastomer available under the trade name HYTREL. This selection of materials enables a compression of ribs 48-54 in the course of insertion of housing 42 into parent housing 12, as is now discussed in connection with FIGS. 2 and 3.

Figure 2A:
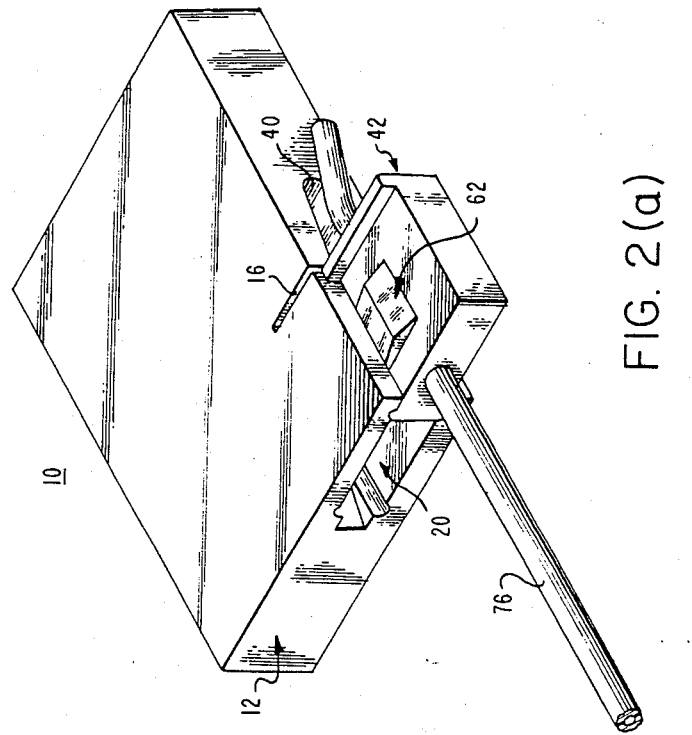
FIG. 2(a) repeats FIG. 2 but with a fiber disposed non-retentively in the insert housing.
Figure 2:
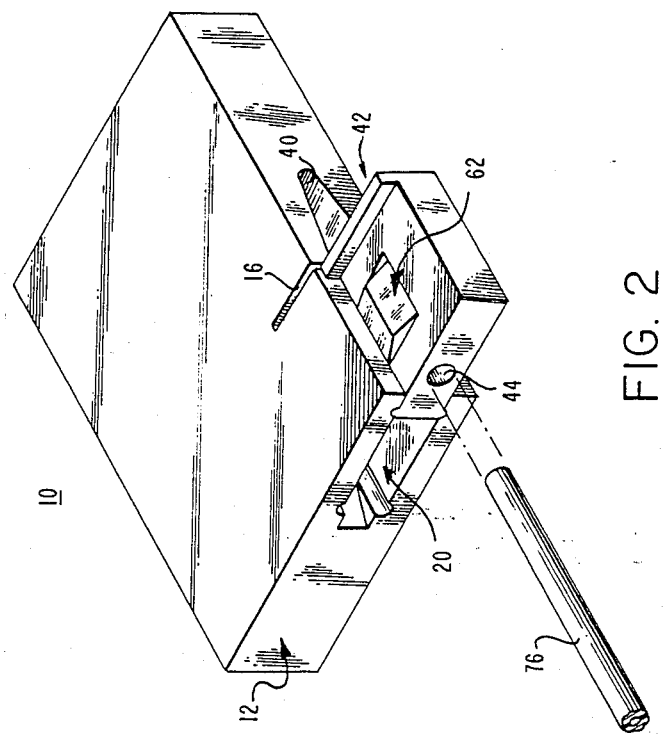
FIG. 2 is a perspective view of the FIG. 1 apparatus with its housings in pre-latched condition.

FIG. 2 shows respective housings 12 and 42 in what may be termed a pre-latch joinder condition, i.e., the housings are secured in first stage assembly. To reach such pre-latch condition, insert housing 42 is registered sidewardly of parent housing 12 with sidewall 46 of the former aside the sidewall 22 of the latter and with ribs 48-54 engaging sidewall 22 and with flange 58 in registry with guide 60. Housing 42 is now urged into insertion channel 20, ribs 48-54 compressing toward surface 56 under the applied insertion force. As the insertion proceeds to the point at which compressed ribs 48 and 52 enter into registry with track 34 and compressed ribs 50 and 54 register with track 38, the ribs revert to their original state, thereby securing the housings. Engagement between flange 58 and the sidewalls of guide 60 assures parallel disposition as between the ribs and tracks in the course of insertion. The housing parts are so dimensioned that blade cutting edge 14a is leftward of i.e., in non-interfering relation with, fiber channel 44 and that surface 66a of gripper 62 is nested noncontiguously below ceiling 24 of parent housing 12.

With the apparatus so assembled, optical cable 76 of FIG. 2(a) to be terminated is pushed into channel 44 to extend rearwardly outward of flange 58, preferably to extend beyond the terminus of exit chute 40 of parent housing 12. Cable 76 is a plastic fiber cable in the illustrative embodiment and, as may be seen in FIG. 6, the cable includes core 76a, cladding 76b and jacket 76c. The fiber is at this time non-retentively disposed in insert housing 42, as gripper 62 is outwardly self-biased to its FIG. 5 disposition. Thus, cable 76 will rest in openings 78 and 80 of insert housing 42 aligned with channel 44 and will centrally engage ribs 70 and 72 along base 74.

Figure 3:
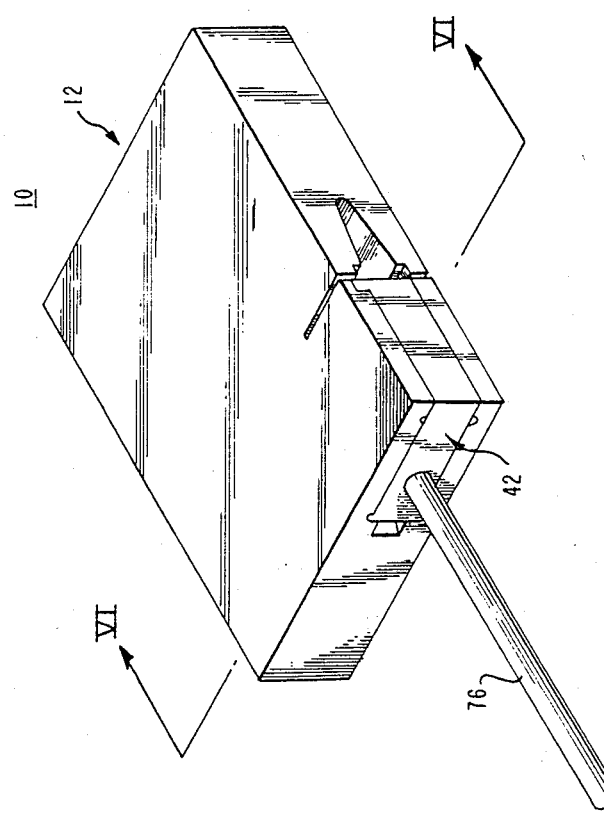
FIG. 3 is a perspective view of the FIG. 1 apparatus with its parent and insert housings assembled in fiber termination condition and with an optical fiber secured therein.
Figure 6:
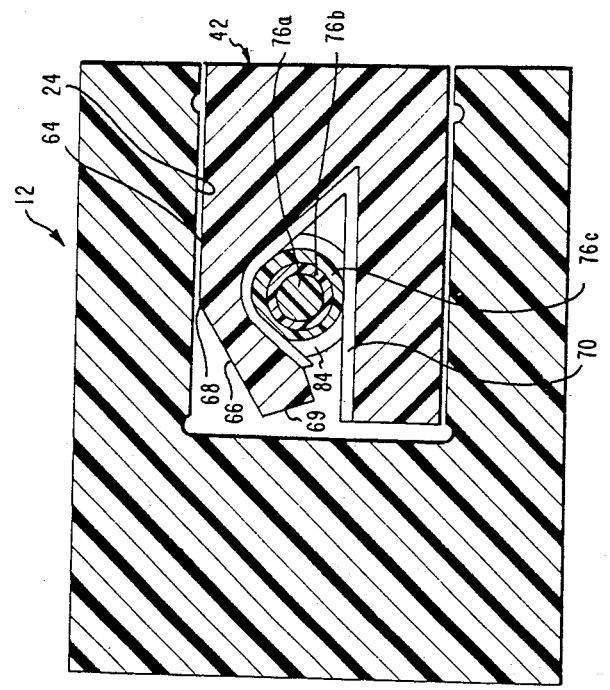
FIG. 6 is a sectional view of the FIG. 3 assembled housings and fiber as seen from plane VI—VI of FIG. 3.

Final assembly of the socket 10 with cable 76 is seen in FIGS. 3 and 6, and is reached by further application of insertion force to insert housing 42 from its fiber-containing FIG. 2(a) pre-latch condition. In the course of this activity, three functions take place as characteristic of the structure thus defined.

In a first function, cable 76 is caused to be retentively secured in channel 44. Thus, as gripper section 66 enters insertion channel 20, it engages ceiling 24 of housing 12 and a camming action occurs whereby gripper 62 is deflected downwardly and the extent of ribs 70 and 72 carried by gripper 62 is forced into engagement with jacket 76c of cable 76. Such camming action continues to the point at which gripper apex 68 engages ceiling 24, gripper trailing section 64 being forced into alignment with surface 56 of insert housing 12.

In the course of continued insertion and following the point at which cable 76 is retentively secured in insert housing 42, opening 80 eclipses blade cutting edge 14a and a second function, that of full fiber separation by cutting occurs, such separation forming a fiber termination end face at opening 80. The remnant of cable 76 enters exit chute 40 and is dispensed from apparatus 10.

During final stage insertion, ribs 48-54 of insert housing 42 again undergo compression toward surface 56 upon leaving tracks 34 and 38, again encountering ceiling 24 of housing 12. The ribs remain compressed until they register with tracks 32 and 36, whereupon ribs 48 and 52 expand into track 32 and ribs 50 and 54 expand into track 36. The third referenced function is thus attained, namely, that of final retention of insert housing 42 in parent housing 12. The assembly may be released by insertion of a screwdriver or like tool in disassembly slot 86 which tapers from front wall 88 of housing 12 into interior side wall 28 and insertion channel 20.

Figure 4:
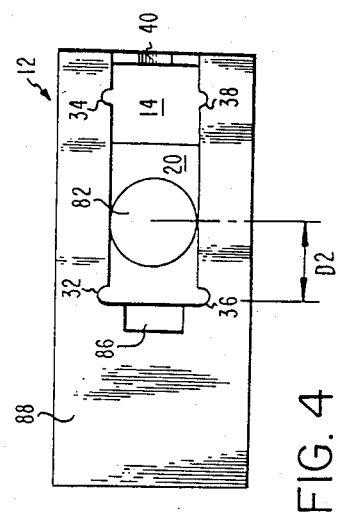
FIG. 4 is a front elevation of the parent housing of FIG. 1.

Since the distance D1 (FIG. 1) between the center of opening 78 and sidewall 46 is made equal under the invention with the distance D2 (FIG. 4) between interior wall 28 of housing 12 and the center of active device residence channel 82 thereof, fiber core 76a is centrally registered with active device 84, e.g., a photodiode, which may be assembled in apparatus 10 permanently or may be installed by a user. As will be appreciated, the cylindrical interior wall of channel 82 is a termination registry surface with which core 76a is aligned and installation of an active device in channel 82 compels device-core registration. Where it is desired to interconnect two fibers, as opposed to the illustrative single fiber to active device termination, the second fiber is placed in channel 82 in place of the active device.

In its several aspects, the invention contemplates a bridging method as between fiber preparation for termination and termination itself, apparatus for both cutting and terminating a fiber, a fiber optic connector for both separating and terminating a fiber and a fiber optic connector component part for separating a fiber to render same readily field-terminatable.

Various changes to the foregoing embodiments and practices may be made thereto without departing from the invention. Thus, while blade 14 is shown as a separate component of the socket, it may be fabricated integrally with the parent housing. While a pre-latch condition is preferred, one can of course practice the invention without same where desired. While a single fiber termination with an active device is described, termination and intercoupling of plural fibers by use of an interconnecting loop in the parent housing and modification of the insert housing to retentively secure such fibers is within the contemplation of the invention. Joint termination of a fiber cable and an accompanying electrical conductor also flows from the invention. In this adaptation, one jointly supports the cable and the conductor in the insert housing for movement into terminating registry respectively with an active device and an electrical contact, e.g., of insulation displacement type, in the parent housing. Further, while the predetermined locus of relative movement of the fiber and separation device is rectilinear, the invention contemplates other than such linewise relative movement or successive translations of the housings.

Likewise, although discussion has been had particularly of the cutting and termination of plastic fibers, skilled artisans will appreciate the ready adaptation of the invention to other varieties of optical elements. Also, while the term "cutting" has been used above and separation of fibers to form termination end faces has been by cutting in an interference path fully through the fibers, those skilled in the art will recognize other fiber separation practices, e.g., surface nicking of a fiber and subsequent pulling to effect separation and termination end face formation.

The particularly disclosed and depicted embodiments of the invention and methods are thus intended in an illustrative and not in a limiting sense. The true spirit and scope of the invention are set forth in the following claims.

We claim:

1. A fiber optic apparatus including means operable for holding an optical fiber, separation means for defining a termination end face for said fiber, and housing means for operating said fiber holding means and for supporting both said fiber holding means and said separation means for relative movement, said housing means defining a terminating surface adjacent said fiber termination end face, whereby said termination end face may be placed in registration with a termination device by said housing means.

2. The apparatus claimed in claim 1 wherein said separation means comprises a cutting blade.

3. The apparatus claimed in claim 2 wherein said housing means supports both said fiber holding means and said separation means for relative movement in an interference path such that said cutting blade fully cuts through said fiber in definintion of said termination end face.

4. In combination, in a fiber optic connector:
   (a) means operable for holding an optic fiber received thereby;
   (b) fiber cutting means;
   (c) a fiber terminating device; and
   (d) means for supporting said fiber holding means, said fiber cutting means and said fiber terminating device, said fiber cutting means and said fiber holding means being movable relative to each other, such relative movement therebetween causing operation of said fiber holding means and further effecting cutting of said fiber to define a termination end face therefor and to provide subsequent registry of said termination end face and said terminating device.

5. The invention claimed in claim 4 wherein said supporting means comprises a parent housing for operating said fiber holding means and for supporting said cutting means and said termination device in a fixed relation therein and an insert housing containing such fiber holding means and insertable in said parent housing.

6. The invention claimed in claim 5 wherein said cutting means comprises a blade member.

7. The invention claimed in claim 5 wherein said parent housing defines an exit chute opening exteriorly thereof adjacent said cutting means, whereby the cut portion of said fiber may be dispensed from said parent housing upon such cutting thereof.

8. A method for cutting an optical fiber and registering such cut fiber with a termination device, comprising the steps of:
   (a) displacing such cut fiber in a predetermined path to engage and hold said fiber in preselected manner at a location spaced from an end of said fiber and to cut said fiber to define a termination end face for said fiber at said location, and
   (b) while continuing such holding of said fiber in said preselected manner, further displacing said fiber in said predetermined path to dispose said termination end face and said termination device in registry.

9. The method claimed in claim 8 wherein said displacing step and said further displacing step are practiced by successive displacements of said fiber in a linewise path constituting said predetermined path.

10. A method for cutting an optical fiber with a cutting device and registering such cut fiber with a termination device, comprising the steps of:
    (a) supporting said cutting device and said termination device in fixed position relative to each other;
    (b) supporting said fiber non-retentively at a location spaced from an end of said fiber;
    (c) disposing said cutting device in interference path with said fiber adjacent said location; and
    (d) displacing said fiber and said cutting device relative to one another to thereupon effect retention of said fiber and to cut said fiber at said location to thereby define a termination end face for said fiber, and continuing such displacement until said termination end face and said termination device are in registry.

11. The method claimed in claim 10 wherein said displacing step is practiced by successive linewise displacment of said fiber.

12. Apparatus for cutting an optical fiber with a cutting device and terminating same with a termination device, comprising:
    (a) first housing means for supporting said cutting device and said termination device therein; and
    (b) second housing means
        (1) for supporting said fiber therein and
        (2) for insertion in said first housing means, said second housing means being adapted in the course of such insertion thereof in said first housing means to engage and secure said fiber therein, to translate said fiber into interference with said cutting device to thereby define a termination end face therefor and to dispose said termination end face in registration with said termination device thereby optically terminating said optical fiber with said termination device.

13. The apparatus claimed in claim 12 wherein said second housing means defines a channel for residence of said fiber therein and fiber gripping means operable by engagement with said first housing means in the course of said insertion to retentively secure said fiber therein.

14. The apparatus claimed in claim 13 wherein said fiber gripping means includes a gripper section bounding such fiber residence channel and deflectable by engagement with said first housing means in the course of said insertion to secure said fiber.

15. The apparatus claimed in claim 14 wherein said first housing means defines first detent means for retaining said second housing means therein on completion of said insertion.

16. The apparatus claimed in claim 15 wherein said first housing means includes second detent means for retentively engaging said first housing means therein prior to completion of said insertion.

17. The apparatus claimed in claim 16 wherein said second housing means includes common means for successively engaging said first and second detent means of said first housing means.

18. A housing for use with an optical element comprising an elongated body of resilient material defining opposed openings and a channel extending therebetween whereby an optical element may be non-retentively disposed in said channel and extend longitudinally therethrough and outwardly of both of said openings, said body having a cantilevered portion communicating with and biased outwardly of said channel and engageable exteriorly of said body to be displaced into said channel for holding said optical element therein.

* * * * *